2,986,566
PROCESS FOR THE PRODUCTION OF HETEROCYCLIC CARBOXYLIC ACIDS

Hartwig Schütt, Dusseldorf-Benrath, Germany, assignor to Henkel & Cie. G.m.b.H., Dusseldorf-Holthausen, Germany, a corporation of Germany No Drawing. Filed Dec. 15, 1958, Ser. No. 780,199
Claims priority, application Germany Dec. 20, 1957
9 Claims. (Cl. 260—326.3)

This invention relates to a process for producing heterocyclic carboxylic acids. It more specifically relates to the production of such compounds from mercury substituted heterocyclic compounds, wherein the mercury is attached directly to the heterocyclic ring.

I have found that heterocyclic carboxylic acids or their salts or derivatives can be obtained in simple fashion and with good yields by heating mercury substitution products of heterocyclic compounds, in which the mercury is attached directly to the heterocyclic ring, in the presence of carbon dioxide under pressure and in the presence of acid-binding agents to temperatures above 150° C. and, if desired, transforming the salts thus obtained into the free acids or their derivatives.

The mercury substitution products of heterocyclic compounds which are used as starting materials for the process according to the invention are known substances or may be produced in accordance with known processes, in most cases by very simple methods. They are derived from a number of heterocyclic ring systems, for instance, from thiophene, furan, or pyrrole; these heterocyclic compounds may also carry substituents, such as hydrocarbon radicals or halogen atoms.

Examples of such compounds are the following:

2-chloro-mercuric-thiophene,
5-chloromercuric-2-methyl-thiophene,
5-chloromercuric-2-ethyl-thiophene,
2-chloromercuric-3-ethyl-thiophene,
5-chloromercuric-2-propyl-thiophene,
5-chloromercuric-2-phenyl-thiophene,
2-chloro-3,4-dimethyl-thiophene,
3-chloromercuric-2,5-dimethyl-thiophene,
5-chloro-2-chloromercuric-thiophene,
5-bromo-2-chloromercuric-thiophene and others.

Similarly, those compounds which contain two heterocyclic rings attached to a mercury atom may be used as starting materials, as may compounds which contain more than one mercury atom attached to a heterocyclic ring. Examples of such compounds are:

Bis-α-thienyl-mercury,
bis-[5-methyl-thienyl-(2)]-mercury,
bis-[3-ethylthienyl-(2)]-mercury,
bis-[5-chlorothienyl-(2)]-mercury,
2,5-bischloromercuric-thiophene,
2,5-bis-chloromercuric-3-isopropyl-thiophene,
2,5-bis-chloromercuric-3,4-dimethyl-thiophene,
tetrakis-chloromercuric-thiophene.

In all cases the corresponding hydroxymercuric compounds or other salts of these compounds, such as the sulfates or acetates, may be used with equal success.

Moreover, the corresponding derivatives of furan, such as furyl-2-mercurychloride, or of pyrrole and other heterocyclic compounds, even those which are derived from poly-nuclear heterocyclic compounds, such as dithienyl, thionaphthene, cumarole, carbazole, or indole, may be used in place of the above-mentioned thiophene derivatives.

Of practical importance as starting materials for the new process are primarily those mercury substitution products which may simply be produced from heterocyclic compounds and mercury salts in aqueous solution, for example chloromercuric thiophene and other derivatives of hydroxymercury-thiophene. Similarly, mixtures of those mercury compounds which are obtained in industry in the purification of thiophene-containing benzene with the aid of aqueous mercury salt solutions, may be used and they represent a preferable starting material for the performance of a new process on an industrial scale.

Alkali metal carbonates are primarily suitable as acid-binding agents. Especially good yields are obtained when potassium carbonate is used. Rubidium carbonate or cesium carbonate, which are equally suitable as the potassium salts, are less desirable for the practical performance of this process for economical reasons. The amount of acid-binding material should advantageously be at least as great as that required for neutralizing all of the carboxyl groups which are formed during the reaction. Most advantageously, however, an excess of the acid-binding agent is employed.

In many cases an improvement of the yield can be achieved by adding potassium cyanate to the reaction mixture. For example, this is the case when derivatives of thiophene are used as starting materials. In these cases, therefore, the process according to the invention is preferably carried out in the presence of potassium cyanate.

The above-mentioned starting materials are preferably employed in dry and thoroughly comminuted form and are intimately admixed with each other. This intimate admixture may, for example, be achieved by grinding the materials together in a ball mill. In order to achieve as complete a reaction of the starting materials as possible it may further be advantageous to maintain the reaction mixture in motion by stirring or by agitating the reaction vessel, so that the use of stirrer autoclaves, rotary autoclaves or shaker autoclaves is recommended for the performance of the process.

In general, the reaction according to the invention proceeds at temperatures above 150° C. The optimum reaction temperature is different and depends upon the particular starting materials used. In general, this optimum temperature lies between 200 and 350° C. The upper limit for the reaction temperatures is determined by the decomposition temperatures of the starting materials or of the end products, so that very often temperatures even above 350° C. may be used without disadvantage.

As a rule, for the achievement of good yields in the performance of the novel process, it is necessary to operate in the presence of carbon dioxide under pressure. In place of pure carbon dioxide, gaseous mixtures which contain inert gases, such as nitrogen, methane or argon, may be used for this purpose. The presence of large amounts of oxygen should advantageously be avoided. The pressure required for the achievement of good yields lies, in general, between about 5 and 200 atmospheres. The application of higher pressures, however, is not damaging.

The separation of the reaction products is, as a rule, simple. For example, the separation may be accomplished by dissolving or suspending the reaction mixture in water and, after filtering off insoluble compounds, which include mercury and mercuric oxide, acidifying the solution with inorganic or organic acids. The free acids, provided they do not crystallize out as a result of their low solubility, may be extracted in customary fashion with the aid of an organic solvent, such as ether, and may in this manner be isolated. In some cases, particularly if the quantity of starting material is large, it may be advantageous to distill the mercury formed by the reaction in vacuo out of the reaction vessel prior to cooling of the reaction mixture.

With the aid of the process according to the invention, a number of heterocyclic carboxylic acids which have heretofore been comparatively difficult to produce may be produced in simple fashion in the form of their salts. From these salts it is then possible to obtain the free acids or their derivatives, such as the acid chlorides or their esters, in accordance with known methods. For example, the process makes it possible to obtain thiophene dicarboxylic acid-2.5 or its potassium salts with good yield from mercury compounds of thiophene which are difficultly soluble in water and which are obtained in the purification process of raw benzene with the aid of mercury salt solutions. In similar fashion, the corresponding 2,5-dicarboxylic acids or their salts are obtained from other mercury compounds, such as from the mercury compounds of furan or pyrrole.

Mercury compounds of polynuclear heterocyclic systems containing only one heteroatom often yield monocarboxylic acids or their salts as reaction products, as do in some cases the derivatives of substituted heterocyclic systems. For example, thionaphthene-2-carboxylic acid may be obtained in the form of its potassium salt from the mercury compounds of thionaphthene. These monocarboxylic acids, however, may be rearranged into dicarboxylic acids by heating their salts, especially their potassium salts, to temperatures above 300° C., as the applicant has previously discovered. By a suitable control of the reaction temperature, therefore, dicarboxylic acids or their salts may be obtained from mercury compounds of polynuclear heterocyclic compounds with only one heterocyclic atom.

The following specific examples are presented to enable persons skilled in the art to better understand and practice my invention and it will be understood that they are not intended to be limitative.

Example I 10.0 gm. 2-chloromercuric-thiophene (produced according to Steinkopf, Ann. 403, 59), 30.0 gm. anhydrous potassium carbonate and 30.0 gm. potassium cyanate were intimately admixed by grinding in a ball mill, and the mixture was placed into a rotary autoclave having a capacity of 200 cc. The air was displaced from the autoclave by flushing with carbon dioxide, subsequently, carbon dioxide was introduced under pressure at 40° C. until the internal pressure reach 50 atmospheres. The contents of the autoclave were then heated for 5 hours at 300° C. During this time an internal pressure of 98 atmospheres developed. After cooling and releasing the pressure from the autoclave the light gray reaction mixture which weighed 72.2 gm., was suspended in 500 cc. water, the suspension was heated slightly and filtered. The clear filtrate was acidified with concentrated hydrochloric acid and then extracted with ether. The ether extraction solution was dried over sodium sulfate. Thereafter, the ether was evaporated. A residue weighing 4.7 gm. was obtained which consisted of raw thiophenedicarboxylic acide12,5. After recrystallization from water the compound had a melting point of 230° C. and had the theoretical acid number.

Example II

The starting material for this run was a mixture of thiophene-mercury compounds obtained by the treatment of thiophene containing benzene with aqueous mercury chloride solution. 20.0 gm. of this mixture were finely milled together with 50.0 gm. anhydrous potassium carbonate and 30.0 gm. potassium cyanate, and the resulting mixture was heated in an autoclave for four hours at 310° C. During the heating step a carbon dioxide atmosphere under a pressure of 100 to 110 atmospheres was maintained, in the autoclave. After cooling and releasing the pressure from the autoclave, the reaction produce was worked up as described in Example 1. 9.0 gm. raw thiophene-2,5-dicarboxylic acid were obtained.

Example III 10.0 gm. α-furyl-mercurychloride, which was produced in accordance with the method of Henry Gilman and George F. Wright (J. Am. Chem. Soc. 1933, page 3302) were intimately admixed with 60.0 gm. anhydrous potassium carbonate by milling and the resulting mixture was heated for three hours at 270° C. in a rotary autoclave having a capacity of 0.2 liter. Prior to heating, carbon dioxide was introduced under pressure until the internal pressure reached 50 atmospheres. The maximum pressure during the heating step was 108 atmospheres. The reaction mixture was worked up in the manner described in Example 1. 2.7 gm. raw dehydromucic acid were obtained.

Example IV 10.0 gm. of the pyrrole-mercury compound produced in accordance with the method of Hans Fischer (Hoppe-Seyler's Zeitschrift für physiologische Chemie, 4, vol. 148 (1925) page 163) from pyrrole and mercury chloride solution, were intimately admixed with 20.0 gm. potassium carbonate and 20.0 gm. potassium cyanate by milling. The resulting mixture was heated for one hour at 250° C. in an atmosphere of carbon dioxide under a pressure of 100 atmospheres in a rotary autoclave having a capacity of 200 cc. The reaction product was suspended in 300 cc. water, the suspension was filtered and the filtrate was strongly acidified with hydrochloric acid. By means of extraction with ether, 3.1 gm. pyrrole-α,α'-dicarboxylic acid were isolated therefrom.

Example V

A mixture consisting of 10.0 gm. 2-chloromercuric-thiophene, 20.6 gm. rubidium carbonate and 10.0 gm. potassium cyanate was heated for 5 hours at 280° C. in an atmosphere of carbon dioxide. The initial pressure of carbon dioxide was 50 atmospheres. The reaction mixture was worked up in the manner described in Example 1. 4.1 gm. thiophene-2,5-dicarboxylic acid were obtained.

Example VI

A mixture consisting of 10.0 gm. 2,5-bis-chloromercuric thiophene, 30.0 gm. anhydrous potassium carbonate and 30.0 gm. potassium cyanate was milled, and the resulting intimate mixture was heated for 5 hours at 280° C. in a rotary autoclave having a capacity of 200 cc. During the heating step an atmosphere of carbon dioxide under a pressure of 100 atmospheres was maintained in the autoclave. The reaction mixture was worked up in the manner described in Example 1. 2.6 gm. thiophene-2,5-dicarboxylic acid were obtained.

Example VII 60.0 gm. of a mixture consisting of equal parts of 2-chloromercuric-thiophene and 2,5-bis-chloromercuric thiophene was heated together with 120.0 gm. anhydrous potassium carbonate and 60.0 gm. potassium cyanate for 5 hours at 290° C. in an atmosphere of carbon dioxide under a pressure of 100 atmospheres in the same manner as described in the preceding example. The reaction mixture was worked up in the manner described in Example 1. 16.1 gm. thiophene-2,5-dicarboxylic acid were obtained.

Example VIII

A mixture consisting of 10.0 gm. 2-chloromercuric thiophene, 20.0 gm. anhydrous potassium carbonate and 20.0 gm. potassium cyanate was placed into a rotary autoclave. Thereafter, the air was displaced from the autoclave by flushing with nitrogen, and then nitrogen was introduced under pressure until the internal pressure reached 50 atmospheres. The autoclave was heated for 5 hours at 290° C. during which time a maximum pressure of 98 atmospheres developed. After cooling and releasing the pressure from the autoclave the reaction mixture was worked up in the same manner as described in Example 1. 0.9 gm. thiophene-2,5-dicarboxylic acid were obtained.

While I have set forth certain specific embodiments, and modes of operation for my invention, it will be understood that they are not intended to limit the invention, and that various modifications and changes may be made without departing from the spirit of the disclosure or the scope of the appended claims.

I claim:

1. The process of claim 4 wherein the mercury substituted heterocyclic compounds used as starting materials are produced from heterocyclic compounds selected from the group consisting of thiophene, furan and pyrrole compounds and mercury salts in aqueous solution.

2. The process of claim 4 wherein the starting material is a mixture of mercury compounds of thiophene obtained in the purification of thiophene containing benzene with mercury salt solutions.

3. The process of claim 4 wherein potassium cyanate is added to the reaction mixture.

4. A process for the production of heterocyclic carboxylic acids which comprises heating mercury heterocyclic compounds wherein the mercury is attached directly to the heterocyclic ring, in the presence of carbon dioxide, and an acid binding agent, at elevated pressures, to a temperature of from 150° C. to a temperature below the decomposition temperature of the starting materials and products, and thereafter liberating the heterocyclic carboxylic acid from the product mixture.

5. A process for the production of thiophene carboxylic acids which comprises heating mercury thiophene compounds wherein the mercury is attached directly to the heterocyclic ring, in the presence of carbon dioxide, and an acid binding agent at elevated pressures, to a temperature of from 150° C. to a temperature below the decomposition temperature of the starting materials and products, and thereafter acidifying the product mixture to liberate the thiophene carboxylic acid.

6. A process for the production of furan carboxylic acids which comprises heating mercury furan compounds wherein the mercury is attached directly to the heterocyclic ring, in the presence of carbon dioxide, and an acid binding agent at elevated pressures, to a temperature of from 150° C. to a temperature below the decomposition temperature of the starting materials and products, and thereafter acidifying the product mixture to liberate the furan carboxylic acid.

7. A process for the production of pyrrole carboxylic acids which comprises heating mercury pyrrole compounds wherein the mercury is attached directly to the heterocyclic ring, in the presence of carbon dioxide, and an acid binding agent at elevated pressures, to a temperature of from 150° C. to a temperature below the decomposition temperature of the starting materials and products, and thereafter acidifying the product mixture to liberate the pyrrole carboxylic acid.

8. The process of claim 4 wherein the acid binding agent is an alkali metal carbonate compound.

9. The process of claim 4 wherein the mercury heterocyclic compounds have substituents attached to the ring selected from the group consisting of lower alkyl radicals, phenyl radicals and halogen atoms.

No references cited.